UNITED STATES PATENT OFFICE.

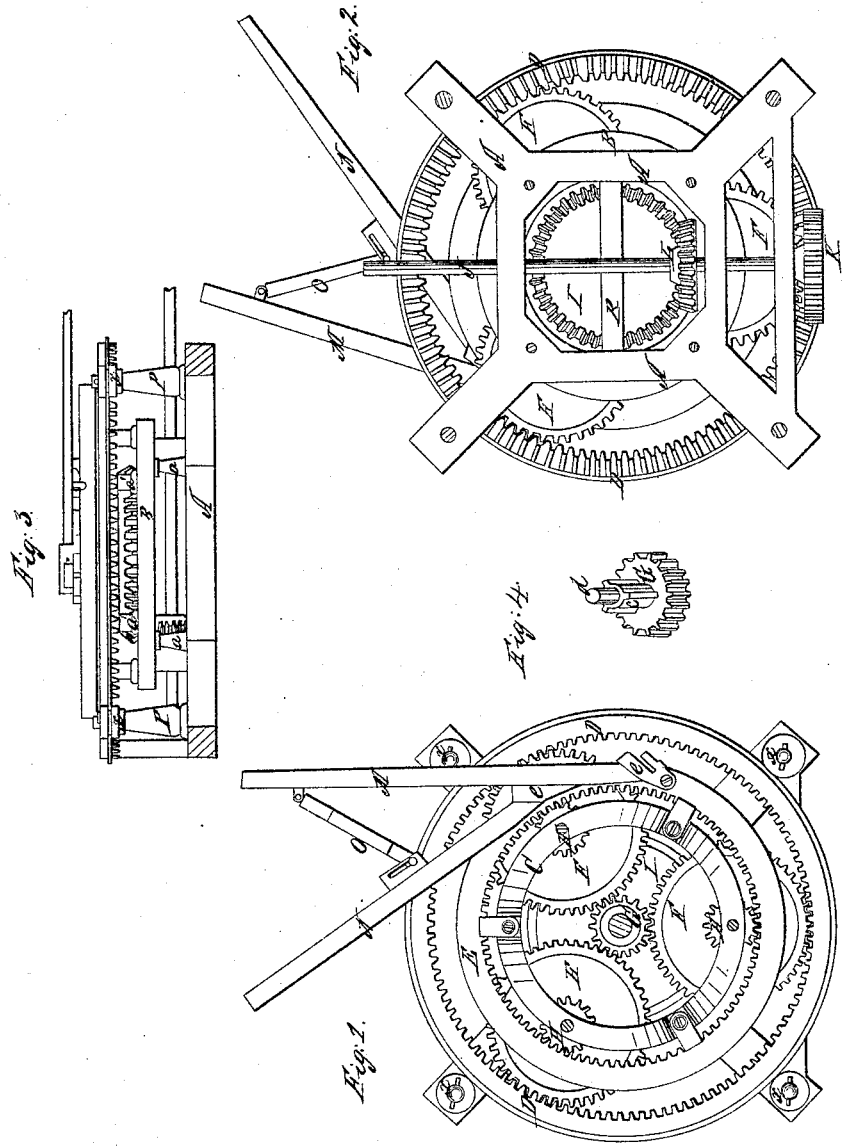

JAMES S. UPTON, OF BATTLE CREEK, MICHIGAN.

HORSE-POWER.

Specification forming part of Letters Patent No. 31,342, dated February 5, 1861; Reissued July 2, 1861, No. 1,206.

*To all whom it may concern:*

Be it known that I, JAMES S. UPTON, of Battle Creek, in the county of Calhoun and State of Michigan, have invented certain new and useful Improvements in Horse-Powers; and I do hereby declare that the following is a full, clear, and exact description of the same, reference being had to the accompanying drawings and to the letters of reference marked thereon.

The nature of my invention consists in constructing and arranging the several parts of this machine in the manner hereinafter described.

In the annexed drawings Figure 1 is a plan view. Fig. 2 is a bottom view. Fig. 3 is a side elevation. Fig. 4 is a perspective of the internal gear wheel.

In the figures A, represents the frame upon which the gearing of the power is secured. Above this frame are two annular rims B, and C, which are supported upon standards $a$, $a$, and $a'$, $a'$. Across the rim B, is secured a piece R, as shown in Fig. 2.

I, represents a wheel which has bevel gear upon its under side and which is situated about the center of the frame.

G, represents an internal gear wheel with a shaft $d$, and with a collar $c$, provided with flanges, as seen, which rests upon the wheel I. The flanges of the collar $c$, fit in grooves cut through the wheel I, so that the two wheels are secured together and the shaft $d$, resting in and upon the cross-piece R, serves as a shaft for both wheels to revolve upon.

F, F, F, represent three gear wheels which stand around the center pinion or internal gear wheel G.

H, H, H, are three pinions which rest upon the three wheels (F) and which are secured to them in the same manner that wheel G, is secured to wheel I. The shafts which pass through the pinions (H) and wheels F, have their upper bearing in the rim C, and their lower bearing in the rim B.

E, represents a rim wheel, with internal gear, into which the teeth upon the pinions (H) catch as shown in Fig. 1.

D, represents a rim wheel also, which is provided both with internal gear, and gear on its under side. The outer circumference of this wheel, D, is provided with a flange, at its center which works in grooves, in the rollers $x$, $x$, situated upon the standards P, P.

$e$, $e$, represent shoes, which are attached to the wheel E', as shown Fig. 1,—these shoes contain and secure the inner ends of the levers M, N. The levers M, and N, are secured or connected together by means of a bar O, one end of which is hinged to lever M, the other being held in a box attached to lever N. Notches are cut in the bottom of the box, which contains the end of the bar O, so that it may be adjusted to tighten the levers when necessary.

J, is a shaft on the frame A, beneath the gearing above described, which is provided with two gear wheels K, and L. The wheel K, is intended to gear into the under side of the wheel D, and the wheel L, is intended to gear into wheel I. These wheels K, and L, are not intended to gear into the wheels D, and I, at the same time and hence the shaft J, is so arranged that it will adjust endwise, allowing only one of the wheels K, and L, to be in gear at one time. When I wish great speed I throw the wheel K, in gear with wheel D, but when I want more power and less speed, I throw wheel L, in gear with wheel I, thus changing the speed and power of the machine as may be desirable.

Having thus fully described my invention what I claim as new and desire to secure by Letters Patent is—

The arrangement of the wheels, K, and L, upon the shaft J, with reference to the wheels, D, and I, so that I may use more power and less speed, or the converse, at the will of the operator substantially as specified.

In witness that I claim the above I have hereunto set my hand in the presence of the subscribing witnesses.

JAMES S. UPTON.

Witnesses:
WM. BROWN,
R. T. MERRILL.